United States Patent [19]

Vogel

[11] Patent Number: 4,980,106

[45] Date of Patent: Dec. 25, 1990

[54] METHOD FOR DRY-PELLETIZING CARBON BLACK AND EQUIPMENT TO IMPLEMENT THE METHOD

[75] Inventor: Karl Vogel, Alzenau-Michelbach, Fed. Rep. of Germany

[73] Assignee: Degussa Aktiengesellschaft, Frankfurt, Fed. Rep. of Germany

[21] Appl. No.: 409,882

[22] Filed: Sep. 20, 1989

[30] Foreign Application Priority Data

Sep. 23, 1988 [DE] Fed. Rep. of Germany ....... 3832404
Mar. 11, 1989 [DE] Fed. Rep. of Germany ....... 3908022

[51] Int. Cl.$^5$ .............................................. B29B 9/08
[52] U.S. Cl. .................................... 264/102; 23/314; 264/114; 264/117; 425/222
[58] Field of Search ................... 264/117, 114, 102; 425/222; 23/314

[56] References Cited

U.S. PATENT DOCUMENTS

| | | | |
|---|---|---|---|
| 2,309,970 | 2/1943 | McKinney | 23/314 |
| 2,422,989 | 6/1947 | Skoog | 23/314 X |
| 2,806,771 | 9/1957 | Cuthbertson | 23/314 X |
| 2,872,300 | 2/1959 | Pollack | 23/314 |
| 2,883,274 | 4/1959 | Ceresna | 23/314 |
| 2,892,689 | 6/1959 | Rushford | 23/314 |
| 4,859,387 | 8/1989 | McGriffin | 264/117 |

FOREIGN PATENT DOCUMENTS 865273 12/1952 Fed. Rep. of Germany .
895286  9/1953 Fed. Rep. of Germany .
2530371  1/1977 Fed. Rep. of Germany .

Primary Examiner—Mary Lynn Fertig
Attorney, Agent, or Firm—Beveridge, DeGrandi & Weilacher

[57] ABSTRACT

The invention concerns a method for dry-pelletizing carbon black, allowing to control pellet quality and increasing the output of any particular pelletizing apparatus. The method calls for pre-compacting the material to be pelletized by means of vacuum before or during pelletizing. The invention also includes two apparatus to carry out the single-stage method version, comprising a pelletizing drum in which are mounted vacuum filter surfaces to pre-compact the powdery initial material in parallel with the on-going prepelletizing procedure. In one apparatus, the inside surface of the drum is a filter surface, in the other apparatus, bundles of stationary filter pipes are provided in the lower drum space.

17 Claims, 3 Drawing Sheets

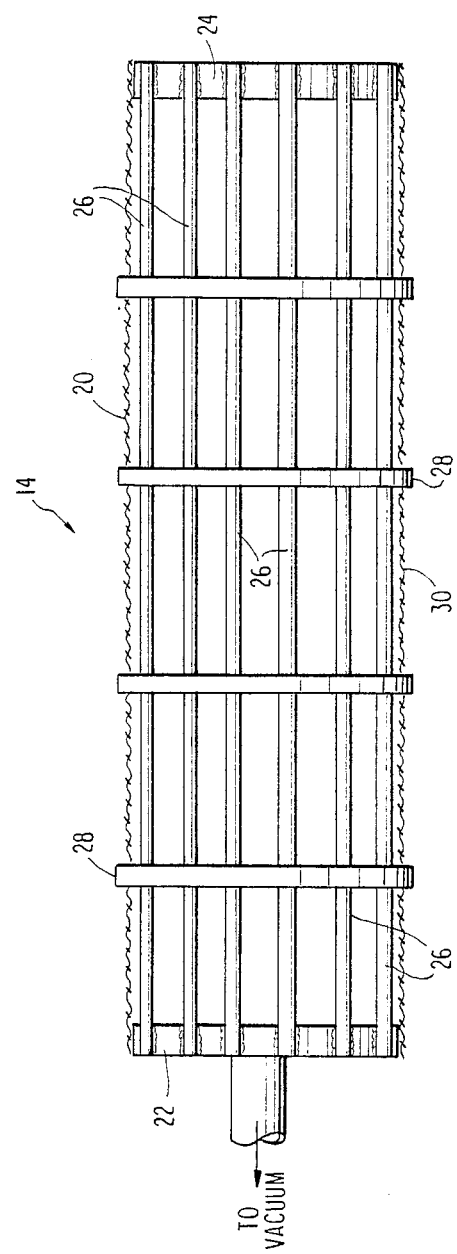

METHOD FOR DRY-PELLETIZING CARBON BLACK AND EQUIPMENT TO IMPLEMENT THE METHOD

BACKGROUND OF THE INVENTION

The invention concerns a method for dry pelletizing of powdered carbon black with control of the pellet quality while increasing the output of a particular pelletizing machine. This is accomplished by pre-compacting the initial carbon black to be pelletized and pelletizing by means of rollers suited to implement one version of this method.

The carbon black obtained in the various production facilities is in the form of a finely distributed powdery material, giving rise to much dust. For the purpose of simpler and more economical handling, much of the produced carbon black is converted into free-flowing pellets.

On one hand, it is known how to wet-granulate carbon black. A specific amount of liquid is added to carbon black in a suitable apparatus, and granulation takes place by a constraining action on such a mixture. On the other hand, dry granulation is known for only very special types of carbon black compounds, whereby the carbon black is converted into granules by rolling motions of variable duration.

Even though almost the entire range of carbon black materials can be made granular by the wet granulation method, and even though the pouring properties, strengths, and flow properties of the pellets so made can be varied over wide ranges, there are significant factors which make wet granulation undesirable.

Mixing the carbon black with a liquid pelletizing medium requires an additional application of energy so that pelletizing can occur. Furthermore, if pelletizing is to be especially soft, which is frequently desired in specific fields of application, wet granulation will offer unsatisfactory results. The addition of binders in the wet granulation process often is a source of interference in subsequent processing. Lastly, a large amount of energy is required to re-evaporate the previously added pelletizing medium, which represents a comparatively uneconomical step.

Only a restricted number of carbon black compounds may be subjected to dry pelletizing methods employed heretofore, and most carbon black compounds could not be pelletized by it.

In the prior art devices, specific pellet parameters such as bulk density, hardness of the individual pellet, pellet size and the pelletizing capacity of the apparatus were largely predetermined relatively to the desired end product. The parameters could be varied only within very narrow limits. Controlled adjustment of the above cited parameters was substantially impossible.

The known procedures were too inflexible to allow an operator to control the pellet quality. They predetermined the pelletizing capacity, and this capacitY could not be raised.

The German Auslegeschrift No. 10 51 815 discloses a process for the dry granulation of powders in the absence of binders for the purpose of controlling the quality of the granulate (desired grain size, granulate hardness). This process compacts the pigment into a flaky intermediate product by compression. The intermediate product subsequently must be comminuted and sifted before the conventional pelletizing step. Accordingly, the procedure consists of: mechanical compression, comminution of the compressed material, sifting and granulation proper. This granulation proper therefore takes place on highly compacted cores obtained from the sifting step. Consequently, the core and the shell of the end pelletized product are compacted non-uniformly, that is, the cross-sectional compression density is nonhomogeneous.

Raw materials, such as carbon black which displays a characteristic particle structure, cannot be pelletized by the above-mentioned procedure unless the characteristic structure is altered. This is because the strong mechanical compression during pre-compaction causes degradation of the characteristic structure with undesirable consequences on properties which are important for further processing and applications.

U.S. Pat. No. 2,883,274 describes an apparatus and a procedure to pelletize and compact carbon black. The apparatus consists of a rotatable cylindrical drum mounted horizontally and a vertical weir mounted to the inside wall of the drum which divides the drum into a pelletizing chamber and a compaction chamber.

In order to move the agglomerated pellets formed in the pelletizing chamber over the weir and into the compaction chamber, use is made of shovel-like means mounted to the weir at the level of the overflow apertures. This shovel-like means communicates with the apertures, scoops up small quantities of pellets from the surface of the pelletizing bed during drum rotation. These scooped-up pellets are stacked until a specific overflow height is attained, at which time the pellets are discharged through the overflow apertures. The pellets fall into the compaction chamber wherein they are further compacted by rotation. When compaction is complete, the pellets are removed from the drum.

Accordingly, the invention described in the above-mentioned patent comprises a pelletizing step followed by a compaction step. This method produces pellets which are highly compacted by mechanical means.

BRIEF DESCRIPTION OF THE INVENTION

An object of the invention is to create a method for dry-pelletizing powdered carbon black wherein the pellet quality can be controlled as desired. Furthermore, the output from the granulating apparatus will be significantly raised and structural degradation of the pellets will be avoided.

The above-mentioned shortcomings of the prior art are overcome by the method of this invention. The above as well as other objects of the invention are attained by providing a method for dry-pelletizing powdered carbon black on the principle of build-up granulation, while controlling the pellet quality. The speed of pelletization is increased by pre-compacting the initial carbon black to be pelletized and by pelletizing by means of rolling.

A feature of the invention resides in pre-compacting the initial carbon black, while retaining its powder form. The pre-compacting is accomplished by suction using rotating or stationary filter surfaces. The bulk weight of the pre-compacted carbon black is in the range of 80–300 g/liter, preferably 100–250 g/l, and in particular 130–220 g/l.

It is true that the method of the invention also pre-compacts a powdery initial material. The purpose, however, is to retain the powder form of the material to be pre-compacted such that, when the material is removed from the filter surface, the material does not contain any highly compacted core granulates, as does the prior art pelletizing device. The problem is solved by applying vacuum only for purposes of pre-compaction, not mechanical compression forces. The exclusive use of vacuum filters ensures gentle pre-compaction of the initial powder carbon black while retaining the original carbon black structure.

BRIEF DESCRIPTION OF THE DRAWINGS

These and other advantageous aspects of the invention will be more fully appreciated when viewed with reference to the attached Figures in which:

FIG. 4 shows an embodiment of the filter in the form of an elongated basket.

DETAILED DESCRIPTION OF THE INVENTION

Suitable filter surfaces permitting the gentle pre-compaction by suction are, for instance, vacuum filter drums. In a preferred embodiment of the invention, pre-compaction is carried out using a vacuum filter drum. Equipment with one or more vacuum filter drums may also be used with this invention. See German patent Nos. 865,273 and 895,286 which are relied on and incorporated herein by reference.

One pre-compaction method in accordance with the invention uses equipment operating with two vacuum filter drums rotating in opposite directions. The carbon black is deposited on the drum surfaces opposite the drum slit. Because of the vacuum in the drums, the carbon black is pulled onto the drum surfaces and is de-aerated in very gentle manner. The drum slit must be located in such a manner that no contact takes place between the carbon black on the two drums. The degree of compaction required for the desired pellet properties can be controlled by varying the intensity of the vacuum, the angular speed of the drum and the rate of the supply of carbon black. It is essential that the initial material be pre-compacted to a bulk weight of 80–300 g/l, preferably 100–250 g/l, and in particular 130–220 g/l.

The product so pretreated in this controlled manner may be fed by known metering means into a wide variety of pelletizing equipment. All pelletizers and pelletizing apparatus may be used for granulation, however, it was found advantageous within the scope of the invention to make use of a rotating pelletizing drum or a disk granulator.

In systems which use the rotating pelletizing drum, the drum may be rotated at different angular speeds and different weir heights may be used. The pre-compacted carbon black is fed-in at the front side by means of known metering systems. When pre-pelletized seed material is used, the intake into the drum of the pre-compacted carbon black is advantageously about one meter behind the intake of the seed material, as seen in the direction of flow (not shown to scale). Because of the continuous rolling-off of the pre-compacted powder carbon black, pelletizing comes into effect.

In systems which use an ordinary disk granulator, which different angular speeds, weir heights and angles of incidence may be used. The pre-compacted carbon black is continuously feed-in using known metering means through the outer edge at the 2:00 o'clock position. The product is pelletized by a constant rolling-off motion. Depending on the desired pellet properties, a pre-pelletized seed material may be supplied or omitted.

A specific variation of the method of the invention provides that the initial material be pre-compacted during pelletizing in a pelletizing drum. This pre-compaction is accomplished by applying a partial vacuum to the drum surface designed as a filter surface or at filter elements mounted in stationary manner in the drum.

Figure 1:
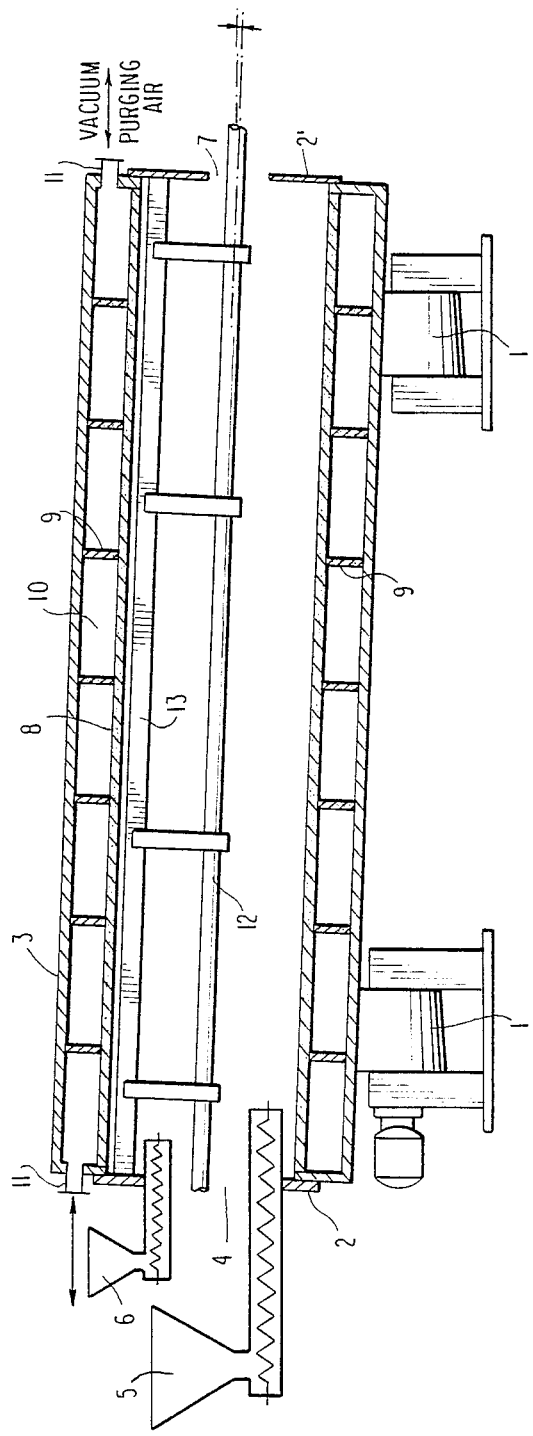
FIG. 1 shows a first embodiment of an apparatus which may be used to implement the invention.

It was found that a sintered metal drum into which a steel pipe equipped with spacers is inserted is especially well suited for use as a pelletizing drum. By applying a vacuum between the sintered metal drum and the steel pipe, the material located inside the sintered material drum, which is equipped with a doctor blade, will be compacted in controlled manner and pelletized once this equipment has been set in motion. FIG. 1 of the attached drawing shows a preferred embodiment of this apparatus. The pelletizing apparatus includes a drum 3 slightly sloping relative to horizontal, with its outer surface resting on drive rollers 1. At its elevated end 4 is an annular weir 2, a supply conduit 5 for powdered carbon black and possibly a supply conduit 6 for pre-pelletized seed material. The weir 2' is at the opposite end 7 of the drum 3 (the discharge end).

The weir 2' is height adjustable. The weir height used is important to the pelletizing procedure. The actual weir height used is best determined by experience and experiment, depending on the desired final product properties and the system parameters.

It is essential to the invention that in this apparatus, a gas-permeable pipe 8 is fastened inside the drum 3 and held away from said drum's inside wall by spacer strips or gas-permeable spacer rings 9, thereby subtending a cavity 10. This pipe 8 is connected in gas-tight manner to the weirs 2,2' and the two ends and the cavity 10 communicates with a vacuum source or with purging air through pipe stubs 11. A fastening bar 12, which may be height-adjustable, passes through the chamber enclosed by the gas-permeable pipe 8. A doctor blade 13, which can be moved close to the pipe 8, is used to create a smooth surface of the sucked-in carbon black. The blade 13 is height-adjustable relative to said fastening bar 12 and may be mounted to the fastening bar 12.

The volume of the cavity 10 is not critical. However, it was found advantageous that the volume of the cavity 10 between the drum 3 and the gas-permeable pipe 8 be approximately 5 to 30, preferably 10 to 20% of the volume of the entire drum 3.

As already mentioned, the gas-permeable pipe 8 must act as a filter relative to the powder carbon black, that is, it must prevent carbon black particles from passing into the cavity 10. Accordingly, a preferred embodiment of the invention provides that the gas-permeable pipe 8 be constructed of a sintered metal alloy (such as, Siperm R by the Remanit Co., or German Material No. 1.4404, Porositaet 80, made by Thyssen) or of a sintered plastic (such as polyethylene) of which the porosity is selected to match the carbon black grade to be pelletized.

The apparatus is operated as follows: the drum 3 is set into rotation and the powdered carbon black is fed continuously into the end-located intake 5. The pre-pelletized material is supplied at the same end, if needed, through intake 6. Simultaneously the cavity 10 between the drum 3 and the gas-permeable pipe 8 is subjected to a specific partial vacuum corresponding to the desired pre-compaction level. If the pores in the pipe 8 should clog at times, the vacuum may be interrupted from time to time for a short while, and a transient, slight excess pressure may be applied. By means of the pressure impulse, carbon black particles having penetrated the filter surface may be flushed out or blown out of it, and the initial gas-permeability shall be restored.

The loose powder carbon black which is continuously wiped off by the doctor blade 13 is subjected to the pelletizing rolling-off motion. The pelletized carbon black so obtained is discharged from the outlet at the opposite end 7 of the drum 3.

Another embodiment of a combined pre-compacting and pre-pelletizing equipment which also may be advantageously used to implement the method of the invention consists of several hollow components which act like filters. These filters are mounted by means of a centrally guided supply line near the bottom of a rotating drum. By applying a controlled vacuum and by time-controlled back flushing, pre-compaction is achieved which simultaneously allows pelletizing.

Figure 2:
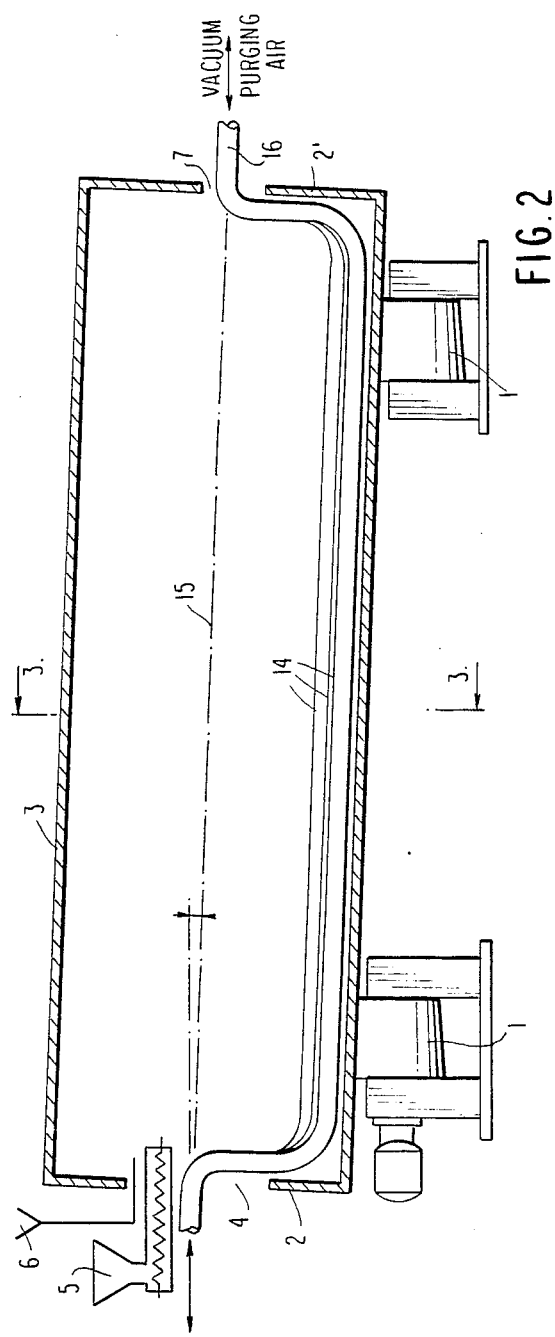
FIG. 2 shows a second embodiment which may be used in conjunction with the invention.
Figure 3:
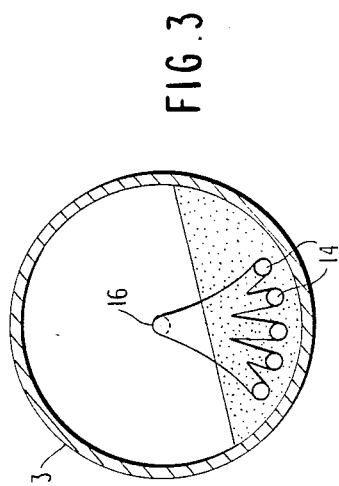
FIG. 3 is a cross-section view taken along line 3—3 of FIG. 2.

A preferred embodiment of this alternative apparatus is shown in FIGS. 2 and 3, where FIG. 3 is a cross-section of FIG. 2. This embodiment includes a drum 3 sloping slightly relative to horizontal with its outer surface resting on drive rollers 1. The elevated end 4 of the drum 3 includes an annular weir 2, a supply conduit 5 for powder carbon black and possibly also a supply conduit 6 for pre-pelletized seed material. The discharge end 7 of the drum has a weir 2' which is height-adjustable.

It is essential to this embodiment of the invention that adjacent but mutually spaced hollow elements 14 be present in the lower drum space. When the drum 3 is rotating, this space is filled with carbon black. These elements 14 are also spaced from the inside drum wall, which they match in curvature. These hollow elements 14 combine at both drum ends into a manifold 16 which leads toward the center axis 15 of the drum 3, passing outside the drum 3, and once outside it, being fixed to it in either a stationary or rotatable manner. The manifold 16 communicates with a source for partial vacuum or excess pressure.

The spacing between the hollow elements 14 and the inside wall of the drum 3 is not critical, nor are the lateral spacings between the hollow elements 14 themselves critical. However, it is necessary that the spacings be such that carbon black can accumulate at the hollow elements 14 when a vacuum is applied. It is also important that the rolling motion of the powder carbon black and the ensuing carbon black pellets not be hampered by cloggings at those areas.

As mentioned, again the gas-permeable hollow elements 14 must act like filters relative to the powder carbon black. Therefore, a preferred embodiment of the last described equipment provides that the hollow elements 14 be constructed of a sintered metal, sintered ceramics (such as $\alpha-Al_2O_3$) or sintered plastics, or be elongated baskets covered with a filter cloth or a filter bag (30). One embodiment of the elongated basket 14 is shown in FIG. 4. Such baskets are typically made of polyethylene formed into a long hollow cylinder 20 with disks at both ends. One disk 22 is open while the other disk 24 is closed off. The disks are connected by rods 26 which are spaced around the periphery (approx. 2.4 cm apart). The rods may be connected to the disks by welding or by other connecting methods. Additional rods 28 are wound around the cylinder. This basket 14 is placed in the bottom of the rotating drum 3, as shown in FIG. 2.

It may be further advantageous in this granulating apparatus that the drum 3 be provided with an internal doctor blade, similar to the type shown in FIG. 1.

The apparatus shown in FIGS. 2 and 3 operates as follows: the drum 3 is set into rotation, and the powder carbon black is fed continuously to the end-located intake 5. When needed, seed-material may be supplied at the intake 6. Simultaneously the bundle of "parallel pipes" (as also shown in FIG. 3) is subject to a specific partial vacuum, the level of vacuum is chosen to provide the desired pre-compaction.

If the pores on the pipe 14 should become clogged from time to time, the vacuum is interrupted briefly, and a short, excess pressure pulse is supplied. Because of the pressure pulse so generated, carbon black collecting at the surface of the porous hollow elements 14 comes loose and is subjected to the rolling-off pelletizing motion. The pelletized carbon black is evacuated at the discharge located at the lower end 7.

Both embodiments of the invention allow combining powder pre-compaction and pelletizing in a single-stage method. Their application is not restricted to carbon black granulation, but fundamentally extends to the dry pelletizing of any fine-particulate powders displaying particle-structure sensitive to mechanical pressure.

The invention achieves the following commercial advantages:

1. High energy-savings.
2. Producing additive-free pelletized carbon black with homogeneous compression density distribution over the entire cross-section of a pellet,
3. Ability to produce very soft pelletized carbon black compounds for special applications,
4. Extending the dry pelletizing method to all types of carbon black compounds,
5. Increasing the production capacity of present pelletizing apparatuses,
6. Control, as desired, over the bulk density, the hardness of individual pellets and the average pellet size of arbitrary carbon black compounds.

The invention is further described below in the light of the following examples.

EXAMPLE 1

A carbon black with the following basic properties is prepared in a reactor by methods known in the art, for example, as described in the German patent application No. 25 30 371.3, the disclosure of which is herein incorporated by reference:

| | | | |
|---|---|---|---|
| Iodine adsorption | (DIN 53 582) | mg/g | 120 |
| DBP adsorption | (DIN 53 601) | ml/100 g | 114 |
| Electron-microscope primary particle size | | nm | 21 |
| Nitrogen surface | (DIN 66 131) | $m^2/g$ | 115 |
| pH value | (DIN 53 234) | | 9.5 |
| Color intensity relative to IRB 3 | (DIN 53 234) | | 109. |

In one instance, this material was packed and shipped from a producer for a furnace carbon black without special sealing being provided for the material (carbon black A). On the other hand, the same material was moved through a vacuum sealing plant of a known type, for instance, as that described in German patent Nos.

865,273 and 895,286, with pre-compaction having been carried out (carbon black B) in accordance with the invention.

The difference between the two carbon black qualities is shown by the bulk and vibration densities:

|  | bulk density | (g/l) | tamped-density | (DIN 53194) |
|---|---|---|---|---|
| carbon black A | 112 |  | 149 |  |
| carbon black B (precomp.) | 160 | 203 |  |  |

To test the dry-pelletizing ability of the two carbon black qualities, a pelletizing drum 400 cm long and 60 cm in diameter was used.

Moreover, this drum comprises, at its discharge side, a weir 16 cm high. As a result, the pelletized carbon black produced thereby must stay in the pelletizing drum until it overflows at the weir. Furthermore the drum is prepared for pelletizing by pre-placing 60 kg of finished pelletized carbon black as a seed material. The pelletizing test is started by setting the drum in motion at 35 rpm and by feeding it continuously at the intake side with 5 kg/h of powder carbon black. Under these conditions the supplied powder carbon black pelletizes and drops out over the weir at the discharge side. The powder carbon blacks A and B provide the following pelletized carbon black grades:

|  | Carbon Black A (control) | Carbon Black of invention) |
|---|---|---|
| bulk density g/l | 360 | 376 |
| tamped density (DIN 53194) g/l | 389 | 401 |
| individual pellet hardness (DIN draft 53603) g | 0.40 | 0.64 |
| SIFT ANALYSIS |  |  |
| <0.125 mm % | 1.1 | 1.6 |
| 0.125–0.25 mm % | 16.1 | 34.8 |
| 0.25–0.5 mm % | 54.6 | 36.4 |
| 0.5–0.71 mm % | 20.4 | 21.0 |
| 0.71 1.0 mm % | 5.0 | 5.0 |
| >1.0 mm % | 2.7 | 1.2 |
| mean pellet size mm | 0.45 | 0.40 |

Accordingly, when employing the method of the invention, and fully identical dry pelletizing conditions are observed, a carbon black is obtained which offers higher bulk density, higher vibrated density and higher pellet hardness while of a lesser average pellet size.

EXAMPLE 2

In order to make the effectiveness of the method of the invention even more clear, the carbon blacks A and B of Example 1 were used again. Again the same dry pelletizing drum 400 cm long and 60 cm in diameter was used. But contrary to Example 1, the weir height at the discharge side of the dry pelletizing drum was lowered to 8 cm. Moreover, no pellet carbon black seed material was pre-placed.

Thereupon the pelletizing drum was started at 35 rmp and 5 kg/h of powder carbon black was continuously fed into the intake side. This supply lasted until the quality of the carbon black discharged over the weir no longer changed.

|  | Carbon Black A (control) | Carbon Black B (method of invention) |
|---|---|---|
| Appearance | dust | pellets |
| bulk density g/l | 192 | 320 |
| tamped density (DIN 53194) g/l | 241 | 347 |
| hardness, individual pellet (DIN draft 53603) g | — | 0.28 |
| SIFT ANALYSIS |  |  |
| <0.125 mm % | — | 4.0 |
| 0.125–0.25 mm % | — | 34.4 |
| 0.25–0.5 mm % | — | 48.0 |
| 0.5–0.71 mm % | — | 10.0 |
| 0.71 1.0 mm % | — | 2.0 |
| >1.0 mm % | — | 1.6 |
| mean pellet size mm | — | 0.36 |

The effectiveness of the method of the invention is shown by the following: since dry pelletizing is not at all initiated in carbon black A, and only dust leaves the pelletizing drum. A well suited dry pellet can be made, however, with carbon black B under fully identical pelletizing conditions. When carbon black B is used, the pelletized carbon black leaving the pelletizing drum is essentially dustfree.

EXAMPLE 3

Approximately ½ ton per hour of carbon black ASTM Grade N326 was pelletized in a dry-pelletizing drum (length=14,500 mm; diameter=2,400 mm; max. weir height=520 mm) at a weir height of 265 mm and an angular speed of 16 rpm. The supplied powder carbon black is not pre-compacted and has a bulk density of about 80 g/l. Increasing the input rate to 1.4 tons an hour led to the collapse of the pelletizing procedure. If however, the increase in the transmission rate takes place in the presence of pre-compacted material (about 200 g/l), the granulation capacity is raised to 2.6 tons an hour.

EXAMPLE 4

To show the influence of the vacuum pre-compaction, and the ability of the invention to control the final pellet parameters, the following series of runs were conducted. Note how the various vacuum pressures allows the operator to control the bulk density, pelletizing time, pellet size and hardness.

Influence of vacuum pre-compaction on final pellet quality

| Seed* | Suction | Density (fluffy) g/l | Bulk dens. (pellets) g/l | Pelletizing time | Pellet size** | Hardness*** |
|---|---|---|---|---|---|---|
| 70% | −0.40 bar | 100 | 120 | 4 h | 2–3 mm | 4 kg |
| 60% | −0.60 bar | 150 | 200 | 3 h | 1.5–2 mm | 10 kg |
| 40% | −0.75 bar | 200 | 275 | 1 h | 1.0–1.8 mm | 12 kg |

-continued

| Seed* | Suction | Density (fluffy) g/l | Bulk dens. (pellets) g/l | Pelletizing time | Pellet size** | Hardness*** |
|---|---|---|---|---|---|---|
| 30% | −0.98 bar | 250 | 350 | 0.5 h | 0.5–1.25 mm | 16 kg |

*seed necessary for fluffy carbon black in dependence of applied vacuum
**main part of Gaub-distribution
***mass pellet crush strength (kg)

Note that the bulk density increases as the precompaction vacuum level increases. The time required for pelletization decreases, as does the pellet size, as the vacuum is increased. Finally, note that the mass pellet crush strength increases as the vacuum pre-compaction level increases.

This data illustrates how the vacuum pre-compaction strength may be used to give the operator control over the final pellet properties and quality of the product.

EXAMPLE 5

This example shows how the rotation speed of the pelletizing drum can be altered to change to control the individual pellet size and the individual crush strength (EPH). Note the decrease in pellet size and the increased strength, as the revolution speed is increased. Again, the table shows that the final pellet parameters may be controlled by the operator.

Influence of pelletizing drum rotation speed on final pellet quality.

| rpm | Pellet size | EPH* |
|---|---|---|
| 10 | 2–3 mm | 4 g |
| 14 | 1.5–2.0 mm | 10 g |
| 18 | 1.0–1.8 mm | 15 g |
| 22 | 0.5–1.25 mm | 24 g |

*individual pellet crush strength (g)

Dry pelletization has the added advantage of creating pellets which are much softer than pellets made by wet pelletization methods. The individual pellet crush strength (EPH) of a typically wet pelletized carbon black is between 25 and 120 g. Dry-pelletized carbon blacks display an EPH between 2 and 22 g.

EXAMPLE 6

By using the apparatus shown in FIG. 1, and carrying out the process illustrated in Example 1, but with the vacuum precompaction taking place within the rotating drum, the same results can be obtained.

EXAMPLE 7

By using the apparatus shown in FIG. 2, and carrying out the process illustrated in Example 1, but with the vacuum precompaction taking place within the rotating drum, the same results can be obtained.

A further disadvantage of wet-pelletized carbon blacks is the fact that there is a nonhomogeneous compression density distribution across the cross-section of the pellet. This results in pellets with variable hardness across a cross-section due to variations in the drying process. Dry pelletized carbon blacks maintain a uniform hardness throughout the cross-section. Uniform hardness facilitates dispersion of the pelletized material during its use.

Until this invention, carbon black with high structure and low specific surface area could not be pelletized economically in a dry process. Examples of such carbon blacks are ASTM grades N 550, N 683 and N 347. These carbon blacks may now be pelletized through the use of this vacuum pre-compaction methods.

In order to produce a suitable final pelletized product, it may be necessary for the operator to experiment with different combinations of the pelletizing system parameters, such as precompaction level, rotation speed, feed input rate, seed input rate and weir height. Because of the many factors involved, it may require some amount of experimentation to finally arrive at the particularly desired result. Such experimentation should be considered normal and within the skill of the art.

While the invention has been described with particular embodiments and examples, these examples are included for purposes of illustration. Various changes and modifications may be made without departing from the spirit and scope of the invention, as set forth in the appended claims.

I claim:

1. A method for dry-pelletizing powdered carbon black based on the principle of build-up granulization, by pre-compacting the initial carbon black to be pelletized and by pelletizing by means of a rolling procedure comprising:
    pre-compacting the initial carbon black by subjecting said carbon black to suction and maintaining the carbon black in its powdery form, using vacuum-loaded rotating or stationary filter surfaces to thereby pre-compact the initial carbon black to a bulk weight in the range of 80–300 g/l, and thereafter pelletizing said pre-compacted carbon black, whereby the pre-compaction allows the input rate for the pelletizing to be increased.

2. The method as defined in claim 1, wherein the pre-compaction is carried out using at least one vacuum-filter drum.

3. The method as defined in claim 1, wherein the pelletizing is carried out in a pelletizing drum or on a disk pelletizer.

4. The method as defined in claim 1, further comprising compacting the initial carbon black during the pelletizing in a pelletizing drum, by applying a partial vacuum between the drum surface and an internal surface, wherein the internal surface acts as a filter surface.

5. The method as defined in claim 1, further comprising compacting the initial carbon black during the pelletizing in a pelletizing drum, by applying a partial pressure to at least one filter contained within the drum, without applying the partial vacuum to the drum surface.

6. The method as defined in claim 1, wherein the bulk weight is in the range of 100 to 250 g/l.

7. The method as defined in claim 1, wherein the bulk weight is in the range of 130 to 220 g/l.

8. An apparatus for dry-pelletizing powdered carbon black based on the principle of build-up granulization comprising:

a pelletizing drum mounted at a slight slope with respect to horizontal, said drum having an outer surface and a set of drive rollers said drum resting on its outer surface on said set of rollers, said drum further having an elevated end at which end are located:

a first supply conduit for admitting the powdered carbon black into said drum;

optionally, a second supply conduit for admitting a pre-pelletized seed material into said drum; and a first annular weir;

said drum further having a lower end and located at said lower end of said drum is a height adjustable annular weir over which the pelletized final product exits from said drum;

said drum further including a gas-permeable pipe mounted inside and to the drum and spaced away from its inside wall by means of spacer strips or gas permeable rings, the space between the pipe and drum creating a cavity;

said pipe connected to said weirs in a gastight manner;

a vacuum source or a purging air source;

said cavity being in communication with said vacuum or air source through a pipe stub;

a holding bar mounted in the space enclosed by the gas-permeable pipe, said holding bar optionally being height adjustable;

a height adjustable doctor blade;

said holding bar capable of supporting said doctor blade, which can be moved with respect to the pipe, in order to maintain a plane surface of carbon black on the pipe.

9. The apparatus as defined in claim 8, wherein the volume of the cavity is in the range of about 5–30% of the drum volume.

10. The apparatus as defined in claim 8, wherein the volume of the cavity is in the range of about 10–20% of the drum volume.

11. The apparatus as defined in claim 8, wherein the gas-permeable pipe is comprised of a sintered metal or of a sintered plastic whose porosity has been selected to correspond to the carbon black grade to be pelletized.

12. An apparatus for dry pelletizing powdered carbon black based upon the principle of build-up granulization comprising:

a pelletizing drum mounted at a slight slope with respect to horizontal, said drum having an outer surface and a set of drive rollers said drum resting on said outer surface on said roller; said drum having an elevated end at which end there is located:

a first supply conduit for admitting the powdered carbon black into the drum;

optionally, a second supply conduit for admitting a pre-pelletized seed material into the drum; and a first annual weir;

said drum further having a lower end and located at said lower end of said drum a height adjustable annular weir over which the pelletized final product exits the drum;

hollow elements made of a gas-permeable material located within the lower end of the drum, said hollow elements functioning as a filter, said hollow elements being spaced apart from the wall of said drum and corresponding to the curvature of said drum wall, and forming into a manifold leading to the center axis of the drum, the manifold mounted to the drum in a rotating or fixed manner, exiting the drum at the center axis and in communication with a source of partial vacuum or excess pressure.

13. The apparatus as defined in claim 12, wherein the hollow elements are pipes made of a sintered metal.

14. The apparatus as defined in claim 12, wherein the hollow elements are made of a sintered ceramic.

15. The apparatus as defined in claim 12, wherein the hollow elements are made of a sintered plastic.

16. The apparatus as defined in claim 12, wherein the hollow elements are constructed as elongated baskets covered by filter cloth or filter bags.

17. The apparatus as defined in claim 12, wherein the drum is equipped with an internal doctor blade.

* * * * *